Patented Oct. 16, 1934

1,977,059

UNITED STATES PATENT OFFICE 1,977,059

METHOD OF MAKING A CHEWING GUM BASE

George A. Hatherell, Burbank, Calif., assignor to Frank A. Garbutt, Los Angeles, Calif.

No Drawing. Application April 13, 1931, Serial No. 529,789

8 Claims. (Cl. 99—11)

This invention relates to chewing gum and particularly to a chewing gum compounded of rubber and a resin.

Chewing gums are now principally produced by compounding the latex gums with various other substances. Chicle, if properly prepared, is recognized as probably the best of the latex gums, but the high price of chicle has forced gum manufacturers to use considerable quantities of inferior latex gums.

The latex gums are natural combinations of resins and rubber (or rubberlike substances) with which are associated small amounts of protein. In the natural latex gums the resin and protein is held in suspension in a very fine state in a matrix of rubber, this peculiar form of structure being produced by the coagulation in an amorphous mass of the sap from which the gum is formed. This form of structure is essential to the production of a satisfactory chewing gum and great care must be taken during the manufacture of chewing gums from the natural latex gums not to destroy it.

If the latex gum is separated into its component elements of rubber, resin, and protein, and an attempt is made to recombine them without restoring the original structure, the resulting material has very different characteristics, being usually a soft rubbery mass that is entirely unsuited to the manufacture of chewing gum, since it becomes sticky when flavoring matter is added and chews like a soft rubber band.

Since the desirable physical characteristics of chewing gums obtained by compounding the latex gums are dependent upon the natural characteristics of the raw gum used, great difficulties are encountered when it is attempted to compound a base from rubber, resin, and protein, although ingredients of the greatest purity and highest quality are used. This has prevented the successful manufacture of satisfactory chewing gums from rubber, resin, and protein. Various inferior chewing gum bases, used as chicle substitutes, have from time to time been marketed, but they have usually been compounded from inferior latex gums, principally the East Indian guttas. These bases do not make a thoroughly satisfactory chewing gum even if carefully prepared in such a way as to preserve the natural structure of the latex since they are subject to oxidation, which produces products having a bad taste, and which may be harmful to the user. Oxidation also deleteriously affects the appearance, keeping and chewing qualities of the gum.

Various attempts have been made to compound a satisfactory chewing gum base from rubber, resin, and a suitable protein, but such attempts have not been successful. This is probably due to the fact that prior inventors have not recognized that rubber is soluble in melted resin. The usual procedure has been to thoroughly mix the rubber and resin at a temperature considerably above the melting point of the resin, with the result that a solution of rubber in resin is produced, which, when cooled, results in a material entirely unsuited to the manufacture of a good chewing gum.

It is an object of the invention to provide a process by which a superior chewing gum base can be produced from resin, rubber, and certain other hereinafter designated materials.

A superior chewing gum is one which, when moist and at mouth temperature, will stretch with noticeable resistance, and, when released, will have only a slight, if any, tendency to return to its original shape. This gives the pleasing resistance noticed in chicle without the excessive springiness found in inferior gums.

A superior chewing gum must also be free from stickiness, which is a characteristic of many inferior gums.

In the actual practice of the invention, rubber is used in the form of crepe sheet, sprayed latex, or similar substantially pure rubber.

Various resins may be used provided that they are of an unsaponifiable nature, that is, that they are stable in moderate alkali solutions; and solvents of rubber. For example, we may use a resene extracted from dammar resin or from guayule; ester gum; mariola resin derived from jelutong; cumarone resin; flexo resin; or their equivalents. These resins must be obtained in a form which is not too hard for proper handling or a proper softening agent may be added. It is preferable to use an inhibiting agent which should be a substance soluble in the resin but insoluble in rubber. Various waxes are satisfactory, notably carnauba wax and candelilla wax. The effective agents in these waxes appear to be complex alcohols of high molecular weight present in high percentage therein. Certain resins which are resin soluble but not soluble in rubber may also be used. Protein, preferably that extracted by alcohol from the cereal grains, is also used.

In some cases, it is desirable to add to the base fine fibers of a material such as wood or asbestos or cotton or silk. The fibers must, of course, be inert under the conditions of manufacture, and insoluble in and harmless to the mouth. Small quantities of natural gums may also be added to slightly modify the quality of the base.

The above materials, if mixed at a temperature above the melting point of the resin, will not produce a satisfactory chewing gum base since the result will be a springy mass having very poor chewing characteristics. It is necessary that the base have a physical structure equivalent to that found in the natural latex gums in which the rubber forms a substantially continuous structure in which the other ingredients are embedded in a state of fine subdivision and in which the rubber is not in solution in the resin.

The desired structure can be produced mechanically by heating a mixture of the various ingredients to a temperature at which the resin is plastic but materially lower than the melting point of the resin and then passing the mixture at substantially this temperature between heavy rolls which work the materials together to produce a physical structure very similar to that found in the coagulated latex gums of commerce.

In the resulting mass the rubber is not wholly in solution in the resin but the small particles of resin and other ingredients are suspended in the body of the rubber.

The purpose of using the inhibiting agent is to control the amount of rubber going into solution in the resin and thus further promote the desired physical structure. The kneading action distributes the rubber continuously through the mass with only a limited amount going into solution. By the use of the inhibiting agent the mixture can be made at higher temperatures without too much of the rubber going into solution.

If the rubberiness or rebound of the base is too great, it can be decreased by adding fibers to the mass. The operation here is quite simple. When the base is stretched, the fibers align themselves in the direction of elongation and the friction between adjacent threads causes a great increase in the friction of pull. Then when the tension is released, there is less rebound as the fiber friction is great enough to counteract the restoring tendency of the rubber. The shape and number of the fibers can be varied to give the desired effect, long fibers making the extension of the mass very difficult, and short fibers are to be preferred.

By the above described methods it is possible to produce a superior chewing gum base which has chewing qualities equal to the best chewing gums now known and which if pure ingredients are used has keeping qualities much better than those found in chewing gums compounded directly from chicle and other latex gums.

I claim as my invention:

1. A method of compounding a chewing gum base which comprises: heating a mixture of pieces of rubber, resin, and other ingredients to a temperature at which the resin is plastic but materially lower than the melting point of the resin; and subjecting the mixture to mechanical forces so applied as to produce an intimate mechanical mixture thereof.

2. A method of compounding a chewing gum base which comprises: mechanically mixing pieces of rubber and resin with a material which is soluble in the resin but insoluble in the rubber, said mixing being done at a temperature below the melting point of the resin.

3. A method of compounding a composition of matter, which comprises: heating a mixture of pieces of rubber, resin, and other ingredients including a material soluble in the resin, but insoluble in the rubber, to a temperature at which the resin is plastic, said temperature being lower than that at which the resin becomes liquid; and subjecting the hot mixture to mechanical forces so applied as to produce an intimate mechanical mixture thereof.

4. A method of compounding a composition of matter, which comprises: heating a mixture of pieces of rubber, resin, and other ingredients, including a material soluble in the resin but insoluble in the rubber, to a temperature at which the resin is plastic, said temperature being lower than that at which the resin becomes liquid; and subjecting the hot mixture to mechanical forces so applied as to produce an intimate mechanical mixture thereof without forming a complete solution of rubber and resin.

5. A method of compounding a chewing gum base, which comprises: mechanically mixing rubber, resin and an inhibiting agent at a temperature such that the resin is in a plastic condition but is not melted, the inhibiting agent being soluble in the resin but not in the rubber.

6. A method of compounding a chewing gum base, which comprises: mixing resin, rubber, and an inhibiting agent soluble in resin but insoluble in rubber, said mixing being performed at a temperature at which the ingredients are plastic but not liquid.

7. A method of compounding a chewing gum base, which comprises: mixing resin, rubber, and candelilla wax, said mixing being performed at a temperature at which the ingredients are plastic but not liquid.

8. A method of compounding a chewing gum base, which comprises: mixing resin, rubber, and carnauba wax, said mixing being performed at a temperature at which the ingredients are plastic but not liquid.

GEORGE A. HATHERELL.